United States Patent [19]

Bingaman

[11] 4,431,950
[45] Feb. 14, 1984

[54] CAPSTAN DRIVE SYSTEM FOR HIGH SPEED TAPE DUPLICATOR

[75] Inventor: Barrett P. Bingaman, Burbank, Calif.

[73] Assignee: CETEC Corporation, El Monte, Calif.

[21] Appl. No.: 402,772

[22] Filed: Jul. 28, 1982

[51] Int. Cl.³ .................... B65H 59/38; B65H 77/00; G05B 5/00; H02P 5/00
[52] U.S. Cl. .................................... 318/7; 226/1; 226/188; 318/326
[58] Field of Search ............... 226/1, 178, 188; 318/6, 318/7, 308, 314, 326, 463, 369; 360/71, 73

[56] References Cited

U.S. PATENT DOCUMENTS

| 3,295,032 | 12/1966 | Branco | 318/7 |
| 3,586,221 | 6/1971 | Rosen | 226/1 |
| 3,644,806 | 2/1972 | Belson et al. | 318/7 |
| 3,826,961 | 7/1974 | Hayase et al. | 318/308 |
| 3,889,169 | 6/1975 | Hirschman et al. | 318/571 |
| 4,266,168 | 5/1981 | Andersen | 318/331 |

OTHER PUBLICATIONS

Magnetic Tape Unit Capstan Servomechanism, IBM Technical Disclosure Bulletin, vol. 15, No. 10, Mar. 1973, J. O. Mitchell, S. D. Roberts and R. W. Van Pelt, p. 2988.

Primary Examiner—Leonard D. Christian
Attorney, Agent, or Firm—Harris, Kern, Wallen & Tinsley

[57] ABSTRACT

Apparatus and method for controlling the speed of a tape drive having an ingoing capstan and an outgoing capstan with a magnetic head therebetween. First and second phase lock loop servo-circuits for driving first and second dc motors which drive the ingoing and outgoing capstans, respectively. A stable reference oscillator providing the reference frequency to one of the phase lock loop servo-circuits and to another phase lock loop circuit which provides the reference frequency to the other phase lock loop servo-circuit. The feedback frequency in the third phase lock loop circuit is adjustable to control the difference in the two reference frequencies to the two servo-circuits for the purpose of controlling the difference in speeds of the ingoing and outgoing capstans.

9 Claims, 1 Drawing Figure

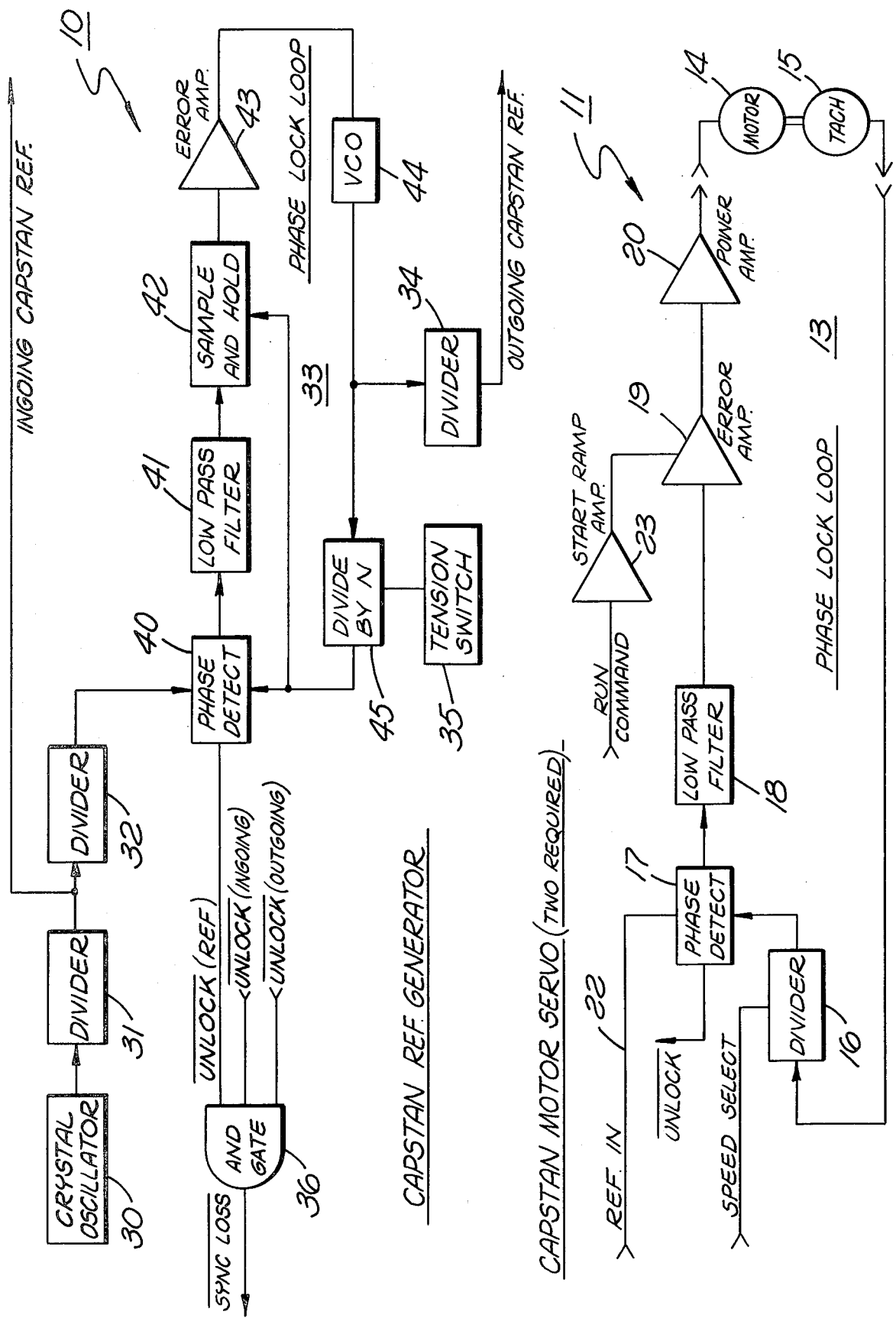

1

CAPSTAN DRIVE SYSTEM FOR HIGH SPEED TAPE DUPLICATOR

BACKGROUND OF THE INVENTION

This invention relates to capstan drive systems for tapes such as are used in magnetic tape read and write functions. The present system is especially suited for use with magnetic tape duplicating equipment which operate at high speeds, such as 240 inches per second.

A tape drive includes a magnetic head, an ingoing capstan upstream of the head, and an outgoing capstan downstream of the head. The tape moves between the ingoing capstan and a pinch roller, over the head, and between the outgoing capstan and a pinch roller. A small and controlled amount of tension is desired in the tape between the two capstans. The speed differential typically is achieved by driving the two capstans at the same rotational speed, with the outgoing capstan of a larger diameter than the ingoing capstan thereby providing a higher linear speed at the outgoing capstan. Changing of the speed differential between the two capstans requires changing of the outside diameter of one or both of the capstans. This requires a supply of capstans or capstan sleeves, and considerable effort on the part of the operator to make a change. Also, the drive motors typically are synchronous type motors with the rotatational speed being line frequency dependent with resultant undesirable changes in tape speed past the head.

It is an object of the present invention to provide a new and improved capstan drive system which utilizes dc motors that are not line frequency dependent thereby providing improved tape speed control. A further object is to provide such a drive system which uses identical mechanical parts for the ingoing and outgoing capstans, with the tape speed differential being achieved by driving the capstans at different rotational speeds. A particular object is to provide such a capstan drive system where the operator may change the speed differential and thereby change the tape tension by operating a selector switch.

It is an object of the invention to provide a capstan drive system incorporating separate servo-controls for each drive motor, preferably phase lock loop servo-circuits, with each circuit controlled by a reference frequency. A further object is to provide such a system utilizing a stable oscillator which provides the reference frequency for one servo-circuit and the reference frequency for a third phase lock loop circuit which in turn generates the other reference frequency as a function of an operator selected frequency divider circuit in the phase lock loop.

Other objects, advantages, features and results will more fully appear in the course of the following description.

SUMMARY OF THE INVENTION

The speed control system of the invention includes first and second dc motors for driving the ingoing and outgoing capstans, respectively, and first and second phase lock loop circuits for driving the first and second motors, respectively. The phase lock loop servo-circuits may be conventional and each includes a phase detector with a reference input and a feedback input. The system also includes a stable reference oscillator which provides one reference input to one servo directly and which provides the other reference input to the other servo through an additional phase lock loop circuit. This third phase lock loop circuit may also be conventional and incorporates a voltage controlled oscillator which produces the reference frequency, and a frequency divider which determines the difference between the two reference frequencies and thereby the motor speed differences and tape tension differences.

The preferred embodiment includes an operator actuated selector switch for controlling the divider in the third phase lock loop circuit. The preferred embodiment also includes speed select dividers in each of the servo-loops so that the operator can set the basic tape speed. A synchronization loss warning circuit and start-up control circuits are also included in the preferred embodiment.

The method of the invention for controlling the speeds of drive motors for ingoing and outgoing capstans of a tape drive include the steps of driving each motor with a phase lock loop servo-circuit having a capstan reference frequency input, generating one of the reference frequencies from a stable reference oscillator, and operating another phase lock loop circuit having the stable reference oscillator output as its reference frequency input and generating the other capstan reference frequency as the output of the oscillator in the phase lock loop circuit.

BRIEF DESCRIPTION OF THE DRAWING

The single FIGURE of the drawing is an electrical block diagram of a speed control system incorporating the presently preferred embodiment of the invention.

DESCRIPTION OF THE PREFERRED EMBODIMENT

The speed control system of the invention includes a capstan reference generator 10 and two capstan motor servos, one of which is shown as 11. The two capstan motor servos are the same, with one motor driving the ingoing capstan and the other motor driving the outgoing capstan.

The capstan motor servo 11 includes a phase lock loop circuit 13 having a dc motor 14, a tachometer 15, a frequency divider 16, a phase detector 17, a low pass filter 18, an error amplifier 19, and a power amplifier 20. The phase lock loop circuit 13 may be conventional in design and operation.

The tachometer 15 functions as a sensor to provide an output signal through the divider 16 to the phase detector 17, which output signal varies as a function of the speed of the motor. The divider 16 permits the operator to select the speed at which the drive operates. Typically the divider will divide by one, two or four and provide tape speeds of 240, 120 or 60 inches per second. The other input to the phase detector 17 is a reference frequency on line 22. The phase detector output is filtered at 18 to provide a dc signal to the error amplifier, with this amplifier output being further amplified at the power amplifier to provide the power for driving the motor 14. The output of the error amplifier 19 is controlled by the output from a start ramp amplifier 23. When the system is turned on, a run command to the amplifier 23 causes this amplifier to generate a ramp which allows an increase of the ouput of the amplifier 19 to accelerate the motor 14 up to the operating speed. characteristics can be selected to produce the desired tape acceleration. Also, the ramp amplifiers in the two capstan motors servo-circuits preferably are designed to provide slightly different ramp outputs, so that the outgoing capstan drive motor starts first so as to maintain tension during acceleration.

The capstan reference generator 10 includes a crystal oscillator 30, a divider 31, another divider 32, a phase lock loop circuit 33, another divider 34, a tension switch 35, and an AND gate 36. The phase lock loop circuit 33 may be conventional in construction and operation, and in the embodiment illustrated includes a phase detector 40, a low pass filter 41, a sample and hold circuit 42, an error amplifier 43, a voltage controlled oscillator 44, and a divider 45.

The output of the oscillator 30 through the divider 31 provides the reference frequency input for one of the capstan motor servos, in the embodiment illustrated, the reference frequency for the ingoing capstan motor. The phase lock loop 33 frequency through the divider 34 provides the reference frequency for the other capstan motor servo, here the outgoing capstan motor.

The output frequency of the voltage controlled oscillator 44 of the phase lock loop circuit 33 is divided by the divider 45 and provided as one input to the phase detector 40. The other reference input to the phase detector is provided from the oscillator 30 through the dividers 31, 32. The output of the phase detector is filtered and amplified and provided as the dc control voltage to the voltage controlled oscillator 44. Filtering is accomplished by the low pass filter 41 and also by the sample and hold circuit 42. The dividing ratio in the divider 45 is adjusted by the tension switch 35 which typically is a fifteen position switch controlled by the operator to obtain the desired tension in the tape drive.

Typically the oscillator 30 is a one megahertz oscillator with each of the dividers 31 and 32 dividing by thirty-two. This provides a reference frequency to the phase detector 40 of about one kilohertz. The voltage controlled oscillator 44 operates at about two megahertz, with the divider 34 dividing by sixty-four. Thus the reference frequencies to the two capstan motor servos are about thirty kilohertz, with the phase lock loop 13 operating at about thirty kilohertz. The phase lock loop 33 operates at about one kilohertz and because of this lower operating frequency, the additional filtering achieved by the sample and hold circuit 42 is utilized.

Typically the divider 45 provides for dividing in the range of two thousand in a plurality of steps, typically fifteen steps. Hence the output of the divider 45 for the figures given above will be about one kilohertz.

The AND gate 36 provides a warning signal to the operator of the loss of synchronization in any of the phase lock loop circuits. Whenever synchronization is lost in a phase lock loop circuit, an unlock signal is provided from the phase detector as an input to the AND gate 36. An unlock signal from any one or more of the phase detectors provides an output from the AND gate indicating synchronization loss. This may be in the form of a warning light or an audible alarm or otherwise as desired.

The speed control system utilizes two capstans with dc motors, with a capstan on each side of the magnetic head assembly. This forms a closed loop capstan drive system which provides improved isolation of tape tension variations and minimizes wow and flutter, in comparison with open loop capstan drive systems. In the embodiment illustrated, the ingoing capstan is driven at a preset speed by a preset frequency for precise tape speed, with three tape speeds selectible. The frequency to the outgoing capstan drive motor is adjustable in a phase lock loop synthesizer circuit to provide precision adjustment of tape tension across the tape head or heads.

I claim:

1. In a speed control system for a tape drive having an ingoing capstan and an outgoing capstan with a magnetic head therebetween, the combination of:

first and second dc motors for driving said ingoing and outgoing capstans, respectively;

first and second phase lock loop circuits for driving said first and second motors, respectively, each of said first and second phase lock loop circuits including a motor speed sensor providing a motor speed signal, a phase detector having said motor speed signal and a capstan reference signal as inputs, an amplifier for driving the motor, and a low pass filter between the output of said phase detector and the input of said amplifier;

a stable reference oscillator providing one of said capstan reference signals; and a third phase lock loop circuit for producing the other of said capstan reference signals, and including a phase detector having an output of said stable reference oscillator as an input, a voltage controlled oscillator providing an output frequency varying as a function of the input voltage thereto, a low pass filter between the output of said phase and the input of said voltage controlled oscillator, and a frequency divider circuit having the output of said voltage controlled oscillator as an input and providing a second input to said phase detector, with said voltage controlled oscillator output providing said other capstan reference signal.

2. A speed control system as defined in claim 1 including means for setting the division obtained with said frequency divider circuit of said third phase lock loop circuit providing for control of the difference in speeds of said first and second motors.

3. A speed control circuit as defined in claim 2 including a second adjustable frequency divider circuit in each of said first and second phase lock loop circuits between said speed sensor and said phase detector providing for selection of the tape drive speed.

4. A speed control system as defined in claim 3 including means for indicating when synchronism is lost in one or more of said phase lock loop circuits and comprising a gate circuit having inputs from each of said phase detectors and providing an output warning signal when any one of said phase detectors generates an unlock signal as a result of lost of synchronism.

5. A speed control system as defined in claim 4 wherein each of said first and second phase lock loop circuits includes a second amplifier between said low pass filter and said motor drive amplifier, and a third ramp output generating amplifier with the output of said third amplifier controlling the maximum output of said second amplifier, and including an operator command input for control of said third amplifier.

6. A speed control system as defined in claim 5 wherein said third amplifiers provide different output ramps for said first and second motors, with said second motor being brought up to speed earlier than said first motor.

7. A speed control system as defined in claim 1 including a sample and hold circuit in said third phase lock loop circuit between said low pass filter and voltage controlled oscillator as a part of the low pass filtering.

8. In a method of controlling the speeds of drive motors for ingoing and outgoing capstans of a tape drive, the steps of:

driving each motor with a phase lock loop servo-circuit having a capstan reference frequency input;

generating one capstan reference frequency for one servo-circuit from a stable reference oscillator; and operating a third phase lock loop circuit having the stable reference oscillator output as its reference frequency input and generating the other capstan reference frequency for the other servo-circuit as the output of a voltage controlled oscillator in the third phase lock loop circuit.

9. The method as defined in claim 8 including varying the feedback frequency in the third phase lock loop circuit by dividing the output frequency of the voltage controlled oscillator as a function of the desired difference in speeds of the ingoing and outgoing capstans.

* * * * *